(12) United States Patent
Hu et al.

(10) Patent No.: US 12,477,342 B2
(45) Date of Patent: Nov. 18, 2025

(54) METHOD FOR CONFIGURING EVOLVED PACKET SYSTEM NON-ACCESS STRATUM SECURITY ALGORITHM AND RELATED APPARATUS

(71) Applicant: HUAWEI TECHNOLOGIES CO., LTD., Guangdong (CN)

(72) Inventors: Xiange Hu, Shanghai (CN); Linping Yang, Shanghai (CN); Wen Hu, Shanghai (CN); Li Qiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 18/232,227

(22) Filed: Aug. 9, 2023

(65) Prior Publication Data

US 2023/0388802 A1   Nov. 30, 2023

Related U.S. Application Data

(63) Continuation of application No. PCT/CN2022/075767, filed on Feb. 10, 2022.

(30) Foreign Application Priority Data

Feb. 10, 2021   (CN) .......................... 202110183922.0

(51) Int. Cl.
*H04L 29/06*   (2006.01)
*H04L 9/40*   (2022.01)
(Continued)

(52) U.S. Cl.
CPC ............. *H04W 12/37* (2021.01); *H04L 63/20* (2013.01); *H04W 12/033* (2021.01)

(58) Field of Classification Search
None
See application file for complete search history.

(56) References Cited

U.S. PATENT DOCUMENTS 10,750,366 B1 *   8/2020   Gundavelli ......... H04W 12/069
10,771,978 B2 *   9/2020   Ben Henda ........... H04W 76/15
(Continued)

FOREIGN PATENT DOCUMENTS

CN   101835156 A   9/2010
CN   102595369 A   7/2012
(Continued)

OTHER PUBLICATIONS

Yu, Da; Wen, Wushao. Non-access-stratum request attack in E-UTRAN. 2012 Computing, Communication and Applications Conference, https://ieeexplore.ieee.org/stamp/stamp.jsp?tp=&arnumber=6154001 (Year: 2012).*

(Continued)

*Primary Examiner* — Jeremiah L Avery
(74) *Attorney, Agent, or Firm* — Fish & Richardson P.C.

(57) ABSTRACT

This application discloses methods and related apparatuses for configuring an EPS NAS security algorithm in the field of communication technologies. In an example technical solution provided in this application, an access and mobility management function entity determines whether a selected EPS NAS security algorithm has been successfully provided to a terminal device, and after determining that the selected EPS NAS security algorithm has not been successfully provided to the terminal device, the access and mobility management function entity provides the selected EPS NAS security algorithm to the terminal device again.

22 Claims, 8 Drawing Sheets

(51) Int. Cl.
*H04W 12/033* (2021.01)
*H04W 12/37* (2021.01)

(56) References Cited

U.S. PATENT DOCUMENTS

| | | | | |
|---|---|---|---|---|
| 2016/0094988 | A1* | 3/2016 | Lee | H04L 9/0825 380/270 |
| 2017/0318463 | A1* | 11/2017 | Lee | H04W 60/00 |
| 2018/0167915 | A1* | 6/2018 | Lee | H04W 72/23 |
| 2018/0242147 | A1* | 8/2018 | Fransen | H04W 76/10 |
| 2019/0174449 | A1* | 6/2019 | Shan | H04W 60/04 |
| 2020/0178076 | A1* | 6/2020 | Ben Henda | H04W 12/0471 |
| 2020/0221281 | A1* | 7/2020 | Rajadurai | H04W 76/30 |
| 2020/0228987 | A1* | 7/2020 | Ben Henda | H04W 12/106 |
| 2020/0236544 | A1* | 7/2020 | Kunz | H04W 4/70 |
| 2020/0236554 | A1* | 7/2020 | Lee | H04W 12/03 |
| 2020/0323017 | A1 | 10/2020 | Niemi et al. | |
| 2020/0359202 | A1* | 11/2020 | Pan | H04L 61/00 |
| 2020/0396673 | A1* | 12/2020 | Tiwari | H04W 48/16 |
| 2021/0160691 | A1* | 5/2021 | Liu | H04W 12/037 |
| 2021/0258316 | A1* | 8/2021 | Liu | H04L 63/0876 |
| 2021/0314776 | A1* | 10/2021 | Ben Henda | H04W 12/60 |

FOREIGN PATENT DOCUMENTS

| | | |
|---|---|---|
| CN | 107786511 A | 3/2018 |
| CN | 109644339 A | 4/2019 |
| CN | 109819439 A | 5/2019 |
| TW | 202027454 A | 7/2020 |
| WO | 2020065132 A1 | 4/2020 |

OTHER PUBLICATIONS

Hu, Xinxin et al. A Systematic Analysis Method for 5G Non-Access Stratum Signalling Security. IEEE Access, vol. 7. https://ieeexplore.ieee.org/stamp/stamp.jsp?tp=&arnumber=8817957 (Year: 2019).*

Ahmad, Ijaz et al. Security for 5G and Beyond. IEEE Communications Surveys & Tutorials, vol. 21, Issue 4. https://ieeexplore.ieee.org/stamp/stamp.jsp?tp=&arnumber=8712553 (Year: 2019).*

Lescuyer, Pierre; Lucidarme, Thierry. Life in EPS Networks. Evolved Packet System (EPS): The LTE and SAE Evolution of 3G UMTS, pp. 229-280. https://ieeexplore.ieee.org/xpl/ebooks/bookPdfWithBanner.jsp?fileName=8041593.pdf&bkn=8040170&pdfType=chapter (Year: 2008).*

Forsberg, Dan et al. Interworking Security between EPS and Other Systems. LTE Security, pp. 183-214. https://ieeexplore.ieee.org/xpl/ebooks/bookPdfWithBanner.jsp?fileName=8043900.pdf&bkn=8040448&pdfType=chapter (Year: 2013).*

Forsberg, Dan et al. EPS Security Architecture, pp. 83-107. https://ieeexplore.ieee.org/xpl/ebooks/bookPdfWithBanner.jsp?fileName=8043541.pdf&bkn=8040448&pdfType=chapter (Year: 2013).*

3GPP TS 33.501 V17.0.0, "3rd Generation Partnership Project; Technical Specification Group Services and System Aspects; Security architecture and procedures for 5G system (Release 17)," Dec. 2020, 253 pages.

3GPP TS 33.401 V15.11.0, "3rd Generation Partnership Project; Technical Specification Group Services and System Aspects; 3GPP System Architecture Evolution (SAE); Security architecture (Release 15)," Mar. 2020, 163 pages.

3GPP TS 24.301 V17.1.0, "3rd Generation Partnership Project; Technical Specification Group Core Network and Terminals; Non-Access-Stratum (NAS) protocol for Evolved Packet System (EPS); Stage 3 (Release 17)," Dec. 2020, 586 pages.

International Search Report and Written Opinion in International Appln. No. PCT/CN2022/075767, mailed on May 6, 2022, 18 pages (with English translation).

Office Action in Taiwanese Appln. No. 111104243, mailed on Sep. 26, 2022, 14 pages (with English translation).

Media Tek Inc., "Recovery from NASC verification failure," 3GPP TSG-SA3 Meeting #98e, S3-200320, e-meeting, Feb. 2-6, 2020, 3 pages.

Huawei et al., "Initiate SMC to provide Selected EPS NAS security algorithms," 3GPP TSG-CT WG1 Meeting #128-e, C1-210980, Electronic meeting, Feb. 25-Mar. 5, 2021, 5 pages.

Huawei et al., "Initiate SMC to provide Selected EPS NAS security algorithms," 3GPP TSG-CT Meeting #128-e, C1-211265, Electronic meeting, Feb. 25-Mar. 5, 2021, 5 pages.

Extended European Search Report in European Appln No. 22752316.4, dated Jun. 4, 2024, 10 pages.

3GPP TS 24.501 V17.1.0, "3rd Generation Partnership Project; Technical Specification Group Core Network and Terminals; Non-Access-Stratum (NAS) protocol for 5G System (5GS); Stage 3; (Release 17)," Dec. 2020, 74 pages.

Office Action in Japanese Appln. No. 2023-548586, mailed on Aug. 27, 2024, 12 pages (with English Translation).

* cited by examiner

METHOD FOR CONFIGURING EVOLVED PACKET SYSTEM NON-ACCESS STRATUM SECURITY ALGORITHM AND RELATED APPARATUS

CROSS-REFERENCE TO RELATED APPLICATIONS

This application is a continuation of International Patent Application No. PCT/CN2022/075767, filed on Feb. 10, 2022, which claims priority to Chinese Patent Application No. 202110183922.0, filed on Feb. 10, 2021. The disclosures of the aforementioned applications are hereby incorporated by reference in their entireties.

TECHNICAL FIELD

This application relates to the field of communication technologies, and in particular, to a method for configuring an evolved packet system (evolved packet system, EPS)non-access stratum (non-access stratum, NAS) security algorithm and a related apparatus.

BACKGROUND

Currently, when a fifth generation (5th generation, 5G) network supports an N26 interface, and user equipment (user equipment, UE) supports an S1 mode, a registration process of the UE includes two security mode command (security mode command, SMC) processes.

In the registration process of the UE, a case that a first SMC process is normal and a second SMC process is abnormal occurs. As a result, the UE after successful registration does not have an EPS NAS security algorithm. Therefore, how to ensure that the EPS NAS security algorithm is successfully configured for the UE becomes an urgent problem to be resolved.

SUMMARY

This application provides a method for configuring an EPS NAS security algorithm and a related apparatus, to ensure that an access and mobility management function entity can successfully configure an EPS NAS security algorithm for a terminal device.

According to a first aspect, this application provides a method for configuring an EPS NAS security algorithm, where the method includes: An access and mobility management function entity determines that a selected EPS NAS security algorithm has not been successfully provided to a terminal device. The access and mobility management function entity provides the selected EPS NAS security algorithm for the terminal device.

In this method, when the access and mobility management function entity fails to provide the selected EPS NAS security algorithm for the terminal device, the access and mobility management function entity provides the selected EPS NAS security algorithm for the terminal device again. It may be ensured that the access and mobility management function entity can successfully configure the selected EPS NAS security algorithm for the terminal device.

In a possible implementation, before the determining, by an access and mobility management function entity, that a selected EPS NAS security algorithm has not been successfully provided to a terminal device, the method further includes: The access and mobility management function entity sends a first message to the terminal device, where the first message includes an information element of the selected EPS NAS security algorithm.

In a possible implementation, the determining, by an access and mobility management function entity, that a selected EPS NAS security algorithm has not been successfully provided to a terminal device includes: determining, by the access and mobility management function entity, that a first completion message has not been received, where the first completion message indicates that the terminal device has received the first message.

In a possible implementation, the determining, by the access and mobility management function entity, that a first completion message has not been received includes: determining, by the access and mobility management function entity, that the first completion message has not been received within a preset time.

In the implementation, the access and mobility management function entity determines, by failing to receive the first completion message within a preset time, that the selected EPS NAS security algorithm has not been successfully provided to the terminal device. This improves accuracy of determining, by the access and mobility management function entity, that the selected EPS NAS security algorithm has not been successfully provided to the terminal device.

In a possible implementation, the first message is a security mode command SMC message, and the first completion message is an SMC completion message.

In a possible implementation, the method includes: The access and mobility management function entity marks the selected EPS NAS security algorithm as invalid.

In the implementation, after determining that the selected EPS NAS security algorithm has not been successfully provided to the terminal device, the access and mobility management function entity marks the selected EPS NAS security algorithm as invalid. The access and mobility management function entity may provide the selected EPS NAS security algorithm for the terminal device again based on marked information indicating that the selected EPS NAS security algorithm is invalid, thereby ensuring that the access and mobility management function entity can successfully provide the selected EPS NAS security algorithm for the terminal device.

In a possible implementation, before the providing, by the access and mobility management function entity, the selected EPS NAS security algorithm for the terminal device, the method further includes: The access and mobility management function entity receives a registration request message from the terminal device.

In a possible implementation, the method further includes: The access and mobility management function entity determines to update the selected EPS NAS security algorithm. The access and mobility management function entity provides an updated selected EPS NAS security algorithm for the terminal device.

In a possible implementation, the method further includes: The access and mobility management function entity determines that the updated selected EPS NAS security algorithm has not been successfully provided to the terminal device. The access and mobility management function entity provides the updated selected EPS NAS security algorithm for the terminal device.

In the implementation, after determining that the updated selected EPS NAS security algorithm has not been successfully provided to the terminal device, the access and mobility management function entity provides the updated selected EPS NAS security algorithm for the terminal device. This ensures that the access and mobility management function entity can successfully configure the updated selected EPS NAS security algorithm for the terminal device, so that the EPS NAS security algorithm in the terminal device is consistent with the updated selected EPS NAS security algorithm determined by the access and mobility management function entity.

In a possible implementation, the access and mobility management function entity supports an N26 interface, and the terminal device supports an S1 mode.

In a possible implementation, a valid 5th generation mobile communication 5G NAS security context indicated by the terminal device exists in the access and mobility management function entity.

According to a second aspect, this application provides a method for configuring an EPS NAS security algorithm, where the method includes: A terminal device determines that a selected EPS NAS security algorithm corresponding to a 5th generation mobile communication 5G NAS security context does not exist. The terminal device deletes the 5G NAS security context. The terminal device sends a second message to an access and mobility management function entity, where the second message is used to request the 5G NAS security context. The terminal device receives an information element of the selected EPS NAS security algorithm from the access and mobility management function entity.

In this method, when the 5G NAS security context already exists in the terminal device, it is first determined whether the corresponding selected EPS NAS security algorithm exists in the 5G NAS security context of the terminal device. If the terminal device determines that the corresponding selected EPS NAS security algorithm does not exist in the 5G NAS security context, the terminal device deletes the 5G NAS security context, and requests the 5G NAS security context from the access and mobility management function entity again. The access and mobility management function entity sends the 5G NAS security context and the information element of the corresponding selected EPS NAS security algorithm to the terminal device again, to ensure that the terminal device can successfully configure the EPS NAS security algorithm.

In a possible implementation, the determining, by a terminal device, that a selected EPS NAS security algorithm corresponding to a 5G NAS security context does not exist includes: determining, by the terminal device, that the information element of the selected EPS NAS security algorithm from the access and mobility management function entity has not been received.

In a possible implementation, the determining, by the terminal device, that the information element of the selected EPS NAS security algorithm from the access and mobility management function entity has not been received includes: skipping, by the terminal device, receiving the information element of the selected EPS NAS security algorithm from the access and mobility management function entity within a preset time.

In the implementation, it is determined, in response to a failure to receive the information element of the selected EPS NAS security algorithm from the access and mobility management function entity within a preset time, that a selected EPS NAS security algorithm corresponding to the 5G NAS security context does not exist in the terminal device. This improves accuracy of determining, by the terminal device, that the selected EPS NAS security algorithm corresponding to the 5G NAS security context does not exist.

In a possible implementation, before the determining, by a terminal device, that a selected EPS NAS security algorithm corresponding to a 5G NAS security context does not exist, the method further includes: The terminal device receives a third message sent by the access and mobility management function entity, where the third message includes the 5G NAS security context. The terminal device sends a third completion message to the access and mobility management function entity, where the third completion message indicates that the terminal device has received the third message.

In the implementation, the terminal device activates the 5G NAS security context by receiving the third message that is sent by the access and mobility management function entity and that carries the 5G NAS security context, and sends the third completion message to the access and mobility management function entity. This ensures that the terminal device successfully activates the 5G NAS security context.

In a possible implementation, the determining, by a terminal device, that a selected EPS NAS security algorithm corresponding to a 5G NAS security context does not exist includes: determining that a next generation radio access network key set identifier ngKSI does not correspond to the selected EPS NAS security algorithm.

In the implementation, it is determined, by determining that the next generation radio access network key set identifier ngKSI does not have the corresponding selected EPS NAS security algorithm, that the selected EPS NAS security algorithm corresponding to the 5G NAS security context does not exist in the terminal device. This improves accuracy of determining, by the terminal device, that the selected EPS NAS security algorithm corresponding to the 5G NAS security context does not exist.

In a possible implementation, the method further includes: The terminal device sets the ngKSI to an invalid value.

In the implementation, when the terminal device determines that the selected EPS NAS security algorithm corresponding to the 5G NAS security context does not exist, the terminal device sets the ngKSI to an invalid value, so as to request the 5G NAS security context from the access and mobility management function entity again in a next registration request.

In a possible implementation, the terminal device is disconnected from a long term evolution LTE system, and the second message is used to request to register with a new radio NR system.

In a possible implementation, the terminal device determines that the access and mobility management function entity supports the N26 interface.

In a possible implementation, the access and mobility management function entity supports an N26 interface, and the terminal device supports an S1 mode.

According to a third aspect, this application provides an apparatus for configuring an EPS NAS security algorithm. The apparatus may include modules configured to implement the method in the first aspect. These modules may be implemented through software and/or hardware.

According to a fourth aspect, this application provides an apparatus for configuring an EPS NAS security algorithm. The apparatus may include modules configured to implement the method in the second aspect. These modules may be implemented through software and/or hardware.

According to a fifth aspect, this application provides an apparatus for configuring an EPS NAS security algorithm. The apparatus may include a processor coupled to a memory. The memory is configured to store program code, and the processor is configured to execute the program code in the memory, to implement the method in the first aspect, the second aspect, or any implementation of the first aspect or the second aspect.

Optionally, the apparatus may further include the memory.

According to a sixth aspect, this application provides a chip, including at least one processor and a communication interface, where the communication interface and the at least one processor are interconnected through a line, and the at least one processor is configured to run a computer program or instructions, to perform the method according to the first aspect, the second aspect, or any possible implementation of the first aspect or the second aspect.

According to a seventh aspect, this application provides a computer-readable medium, where the computer-readable medium stores program code executed by a device, and the program code includes the method according to the first aspect, the second aspect, or any possible implementation of the first aspect or the second aspect.

According to an eighth aspect, this application provides a computer program product including instructions. When the computer program product runs on a computer, the computer is enabled to perform the method according to the first aspect, the second aspect, or any possible implementation of the first aspect or the second aspect.

According to a ninth aspect, this application provides an access and mobility management function entity, including at least one processor and a communication interface, where the communication interface and the at least one processor are interconnected through a line, the communication interface communicates with a target system, and the at least one processor is configured to run a computer program or instructions, to perform the method according to any one of the first aspect or the possible implementations of the first aspect.

According to a tenth aspect, this application provides a terminal device, including at least one processor and a communication interface, where the communication interface and the at least one processor are interconnected through a line, the communication interface communicates with a target system, and the at least one processor is configured to run a computer program or instructions, to perform the method according to any one of the second aspect or the possible implementations of the second aspect.

According to an eleventh aspect, this application provides a communication system, including at least one processor and a communication interface, where the communication interface and the at least one processor are interconnected through a line, the communication interface communicates with a target system, and the at least one processor is configured to run a computer program or instructions, to perform the method according to the first aspect, the second aspect, or any possible implementation of the first aspect or the second aspect.

DESCRIPTION OF EMBODIMENTS

Figure 1:
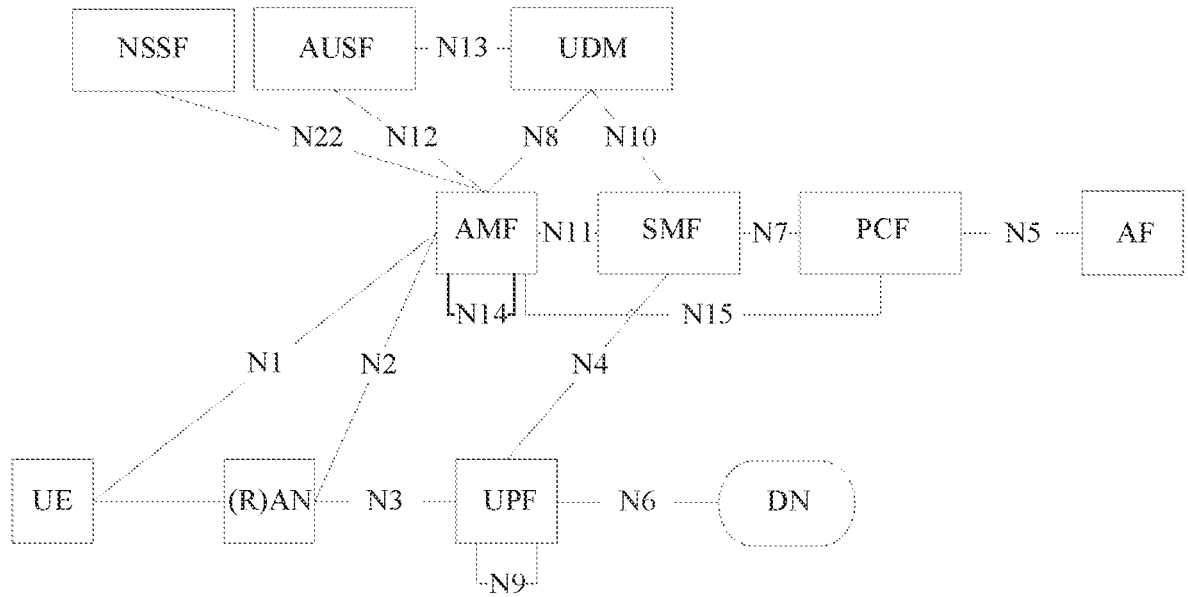
FIG. 1 is a schematic diagram of a 5G network architecture according to an embodiment of this application.

FIG. 1 is a schematic diagram of a 5G network architecture according to an embodiment of this application. A 5G system is also referred to as a new wireless communication system, a new access technology (new radio, NR), or a next-generation mobile communication system.

As shown in FIG. 1, the network architecture includes UE, an access network (access network, AN), a core network, and a data network (data network, DN). The access network is mainly configured to implement functions such as a wireless physical layer function, resource scheduling and wireless resource management, wireless access control, and mobility management. The core network may include a management device and a gateway device. The management device is mainly used for device registration, security authentication, mobility management, location management, and the like of a terminal device. The gateway device is mainly configured to establish a channel with the terminal device, and forward a data packet between the terminal device and an external data network over the channel. The data network may include a network device (such as a server and a router). The data network is mainly used to provide a plurality of data services for the terminal device. It should be noted that, FIG. 1 is merely an example architectural diagram. In addition to the functional units shown in FIG. 1, the network architecture may further include another functional unit. This is not limited in this embodiment of this application.

The access network in the 5G system may be a radio access network (radio access network, (R)AN). The (R)AN device in the 5G system may include a plurality of 5G-(R)AN nodes, and the 5G-(R)AN node may include: a non-3GPP access network, such as an access point (access point, AP) of a Wi-Fi network, and a next generation base station (which may be collectively referred to as a new generation radio access network node (NG-RAN node), where the next generation base station includes a new air interface base station (NR NodeB, gNB), a new generation evolved base station (NG-eNB), a central unit (central unit, CU), and a distributed unit (distributed unit, DU), a gNB in a separate form, or the like), a transmission receive point (transmission receive point, TRP), a transmission point (transmission point, TP), or another node.

As shown in FIG. 1, the core network may include a plurality of functional units such as an access and mobility management function (access and mobility management function, AMF) network element, a session management function (session management function, SMF) network element, a user plane function (user plane function, UPF) network element, an authentication server function (authentication server function, AUSF) network element, a policy control function (policy control function, PCF) network element, an application function (application function, AF) network element, a unified data management (unified data management, UDM) function network element, and a network slice selection function (network slice selection function, NSSF) network element.

The AMF network element is mainly responsible for services such as mobility management and access management. The SMF network element is mainly responsible for session management, UE address management and assignment, dynamic host configuration protocol function, selection and control of the user plane function, and the like. The UPF is mainly responsible for routing and forwarding of a data packet externally connected to a data network (data network, DN) and a user plane and packet filtering, performing functions related to quality of service (quality of service, QoS) control, and the like. The AUSF is mainly responsible for authenticating a terminal device, and the like. The PCF network element is mainly responsible for providing a unified policy framework for network behavior management, providing a policy rule for a control plane function, obtaining registration information related to policy decision, and the like. It should be noted that, these functional units may work independently, or may be combined to implement some control functions, such as access control and mobility management functions such as access authentication, security encryption, and location registration of the terminal device, and session management functions such as establishment, release, and change of a user plane transmission path.

Functional units in a 5G network may communicate with each other through a next generation (next generation, NG) network interface. For example, the UE may transmit a control plane message with the AMF network element through an NG interface 1 (N1 for short), and the RAN device may establish a user plane data transmission channel with the UPF through an NG interface 3 (N3 for short). The AN/RAN device may establish a control plane signaling connection to the AMF network element through an NG interface 2 (N2 for short), and the UPF may exchange information with the SMF network element through an NG interface 4 (N4 for short). The UPF may exchange user plane data with the data network DN through the NG interface 6 (N6 for short), and the AMF network element may exchange information with the SMF network element through the NG interface 11 (N11 for short). The SMF network element may exchange information with the PCF network element through an NG interface 7 (N7 for short), and the AMF network element may exchange information with the AUSF through an NG interface 12 (N12 for short).

The network architecture shown in FIG. 1 is a reference point-based network architecture, and the network architecture is a network architecture in a non-roaming scenario. Certainly, the method in this application may also be applied to a roaming scenario, and the network architecture is not limited to a reference point-based network architecture. A network architecture based on a service-based interface may also be used.

Figure 2:
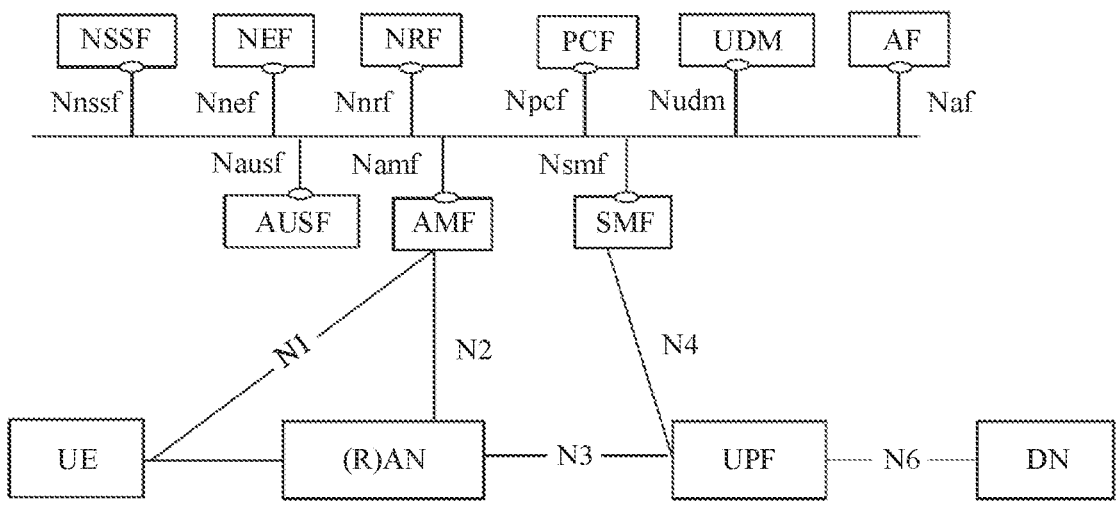
FIG. 2 is a schematic diagram of another 5G network architecture according to an embodiment of this application.

FIG. 2 is a schematic diagram of a 5G network architecture according to another embodiment of this application. As shown in FIG. 2, the network architecture is mainly a network architecture based on a service-based interface. Compared with the network architecture shown in FIG. 1, a core network further includes an NEF network element and an NRF network element.

In a scenario based on the service-based interface, some network elements in the core network are connected through buses. As shown in FIG. 2, an AUSF network element, an AMF network element, an SMF network element, an AF network element, a UDM, a PCF network element, a network storage function (network repository function, NRF) network element, a network exposure function (network exposure function, NEF) network element, and an NSSF network element are interconnected through a bus. When the network elements are interconnected through the bus, a service-oriented interface is used. For example, the AUSF network element is connected to the bus through an Nausf interface, the AMF network element is connected to the bus through an Namf interface, the SMF network element is connected to the bus through an Nsmf interface, the AF network element is connected to the bus through a NAF network element interface, the UDM is connected to the bus through an Nudm interface, the PCF network element is connected to the bus through the NPCF network element interface, the NRF connects to the bus through an Nnrf interface, the NEF connects to the bus through an Nnef interface, and the NSSF connects to the bus through an Nnssf interface.

Currently, when the 5G network supports an N26 interface and the terminal device supports an S1 mode, a registration process of the UE may include two SMC processes. In the registration process of the UE, a case that a first SMC process is normal but a second SMC process is abnormal may occur. In this case, when the UE initiates a registration request again, the network may not re-execute the second SMC process because the first SMC process is normal, that is, a 5G NAS security context between the UE and the network is normal. However, configuration information of an EPS NAS security algorithm is delivered by the network to the UE in the second SMC process. As a result, the UE after successful registration does not have the EPS NAS security algorithm, and problems such as handover failure, service interruption, and/or service function discontinuity are caused when the UE is subsequently handed over to the long term evolution (long term evolution, LTE).

In view of the foregoing problem, this application provides a new technical solution. The technical solution provided in this application may ensure that an access and mobility management function entity can successfully configure the EPS NAS security algorithm for a terminal device.

Figure 3:
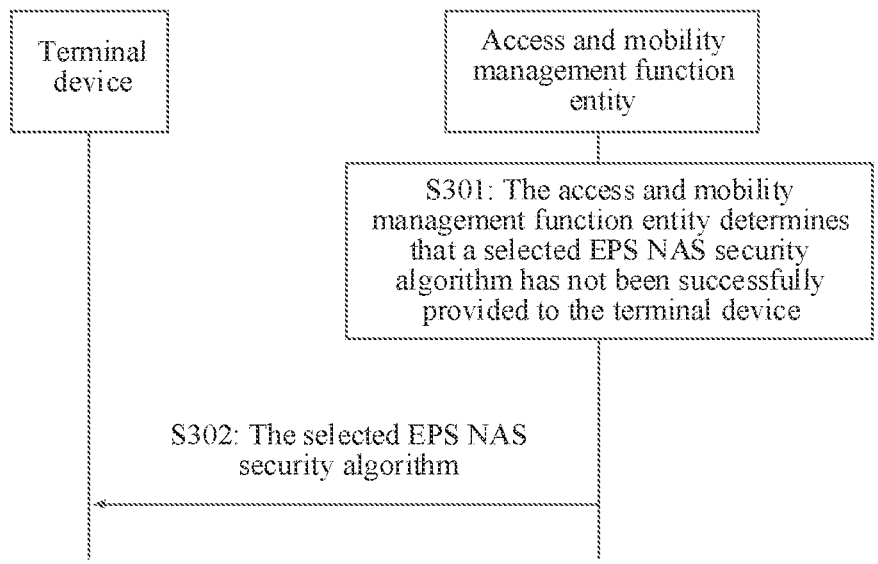
FIG. 3 is a schematic flowchart of a method for configuring an EPS NAS security algorithm according to an embodiment of this application.

FIG. 3 is a schematic flowchart of a method for configuring an EPS NAS security algorithm according to an embodiment of this application. As shown in FIG. 3, the method includes at least S301 to S302.

S301. An access and mobility management function entity determines that a selected EPS NAS security algorithm has not been successfully provided to a terminal device.

In this embodiment, the selected EPS NAS security algorithm provided by the access and mobility management function entity to the terminal device may be an EPS NAS security algorithm selected by the access and mobility management function entity for the terminal device in a scenario where the terminal device does not have a valid EPS NAS security algorithm. Alternatively, the selected EPS NAS security algorithm provided by the access and mobility management function entity to the terminal device may be an EPS NAS security algorithm reselected by the access and mobility management function entity for the terminal device in a scenario where the terminal device already has a valid EPS NAS security algorithm.

An implementation in which the access and mobility management function entity provides the selected EPS NAS security algorithm for the terminal device is that: The access and mobility management function entity sends a first message to the terminal device, where the first message includes an information element (information element, IE) of the EPS NAS security algorithm selected by the access and mobility management function entity for the terminal device. An example of the first message is an SMC message.

The information element of the NAS security algorithm in this embodiment may indicate an algorithm used for encryption and integrity protection, and the information element of the EPS NAS security algorithm may indicate an algorithm used for encryption and integrity protection in an EPS. The information element in this embodiment may also be replaced with information. The information element may be the selected EPS NAS security algorithm itself, or may be information used to indicate the selected EPS NAS security algorithm, for example, may be a valid value that indicates the selected EPS NAS security algorithm. For example, a specific form of the information element in this embodiment may be bits.

In the implementation, an example in which the access and mobility management function entity determines that the selected EPS NAS security algorithm has not been successfully provided to the terminal device includes that: The access and mobility management function entity determines that no first completion message is received from the terminal device, where the first completion message indicates that the terminal device has received the information element of the EPS NAS security algorithm selected by the access and mobility management function entity for the terminal device. For example, when the access and mobility management function entity has not received the first completion message from the terminal device within a preset duration, it may be determined that the selected EPS NAS has not been successfully provided to the terminal device. An example of the first completion message is an SMC completion message.

Another example in which the access and mobility management function entity determines that the selected EPS NAS security algorithm has not been successfully provided to the terminal device includes that: The terminal device sends a first indication message to the access and mobility management function entity if the terminal device has not received the first message from the access and mobility management function entity within a preset time, where the first indication message indicates that the terminal device has not successfully receive the information element of the EPS NAS security algorithm; and after receiving the first indication message, the access and mobility management function entity determines that the selected EPS NAS security algorithm has not been successfully provided to the terminal device.

In some implementations of this embodiment, the access and mobility management function entity supports an N26 interface, and the terminal device supports an S1 mode. The N26 interface is an interface between a fourth generation (4th generation, 4G) core network and a 5G core network, namely, an interface between a mobility management entity function (mobility management entity, MME) network element and an AMF network element, which is used for interoperation between 4G and 5G. That the terminal device supports the S1 mode indicates that the terminal device supports connection to an LTE network.

In some implementations of this embodiment, before the access and mobility management function entity determines whether the selected EPS NAS security algorithm has been successfully provided to the terminal device, or before the access and mobility management function entity provides the selected EPS NAS security algorithm for the terminal, the access and mobility management function entity may receive a registration request (Registration Request) message from the terminal device.

In an example, after receiving the registration request message from the terminal device, the access and mobility management function entity may determine, in response to the registration request message, whether a valid 5G NAS security context indicated by the terminal device exists on the access and mobility management function entity. If the valid 5G NAS security context exists, it is further determined whether the access and mobility management function entity has successfully provided the selected EPS NAS security algorithm to the terminal device. If the valid 5G NAS security context does not exist, an SMC process is delivered to the terminal device, to activate the valid 5G NAS security context indicated by the terminal device.

When the valid 5G NAS security context indicated by the terminal device does not exist on the access and mobility management function entity, if the terminal device supports the S1 mode and the access and mobility management function entity supports the N26 interface, after delivering the SMC process to the terminal device for a first time, the access and mobility management function entity may further deliver the SMC process to the terminal device again, and carry the EPS NAS security algorithm selected for the terminal device. When the valid 5G NAS security context indicated by the terminal device does not exist on the access and mobility management function entity, if the terminal device does not support the S1 mode and/or the access and mobility management function entity does not support the N26 interface, after delivering the SMC process to the terminal device for a first time, the access and mobility management function entity may not deliver the SMC process to the terminal device again, and carry the information element of the EPS NAS security algorithm selected for the terminal device.

In this embodiment, optionally, after determining that the selected EPS NAS security algorithm has not been successfully provided to the terminal device, the access and mobility management function entity may mark marker information indicating that the selected EPS NAS security algorithm has not been successfully configured for the terminal device.

For example, the access and mobility management function entity may be an AMF network element in a 5G network, or may be a network element having an access and mobility management function in a 6G network.

S302. The access and mobility management function entity provides the selected EPS NAS security algorithm for the terminal device.

In other words, after determining that the selected EPS NAS security algorithm has not been successfully provided to the terminal device, the access and mobility management function entity provides the selected EPS NAS security algorithm for the terminal device again.

For example, if the access and mobility management function entity has not received the first completion message from the terminal device (within a preset time) after sending the first message to the terminal device, the access and mobility management function entity may determine that the selected EPS NAS security algorithm has not been successfully provided to the terminal device. Therefore, the first message is resent to the terminal device.

For another example, if the access and mobility management function entity has not received a first completion message from the terminal device (within a preset time) after sending the first message to the terminal device, the access and mobility management function entity may determine that the selected EPS NAS security algorithm has not been successfully provided to the terminal device, and mark the selected EPS NAS security algorithm as an invalid value. Then after receiving the registration request message from the terminal device, when a valid 5G security context of the terminal device exists on the access and mobility management function entity, the access and mobility management function entity resends the first message to the terminal device because the selected EPS NAS security algorithm is marked as an invalid value. For an implementation of the example, reference may be made to the embodiment shown in FIG. 4.

For another example, when the access and mobility management function entity updates the selected EPS NAS security algorithm to the terminal device, and determines that the updated EPS NAS security algorithm has not been successfully provided to the terminal device, indication information for updating the selected EPS NAS security algorithm may be generated. When an initial access request message (for example, a registration request message) is received from the terminal device, the updated EPS NAS security algorithm is provided again to the terminal device based on the indication information. For an implementation of the example, reference may be made to the embodiment shown in FIG. 5.

In an example, the access and mobility management function entity selects a ciphering algorithm and an integrity algorithm that are used in the EPS, and indicates the selected algorithm to the terminal device through an information element of the selected EPS NAS security algorithm, for example, by sending an SMC message to the terminal device. The SMC message includes an information element of the selected EPS NAS security algorithm to indicate the selected algorithm to the terminal device.

In the technical solution provided in this application, when the access and mobility management function entity fails to provide the selected EPS NAS security algorithm for the terminal device, the access and mobility management function entity provides the selected EPS NAS security algorithm for the terminal device again. It may be ensured that the access and mobility management function entity can successfully configure the selected EPS NAS security algorithm for the terminal device.

It should be noted that, in the method provided in this embodiment of this application, the access and mobility management function entity resends an EPS NAS security algorithm selected by the access and mobility management function entity, or a 5G security algorithm obtained when a terminal device supporting a 5G and/or a 6G network registers with a 6G network in the future. The 5G security algorithm may be used by the terminal device to subsequently generate a 5G NAS security context.

In other words, any method in which the access and mobility management function entity sends the NAS security context to the terminal device when determining that the NAS security context used by the terminal device to subsequently generate the NAS security context has not been successfully provided to the terminal device may fall within the protection scope of the technical solutions of this application.

Figure 4:
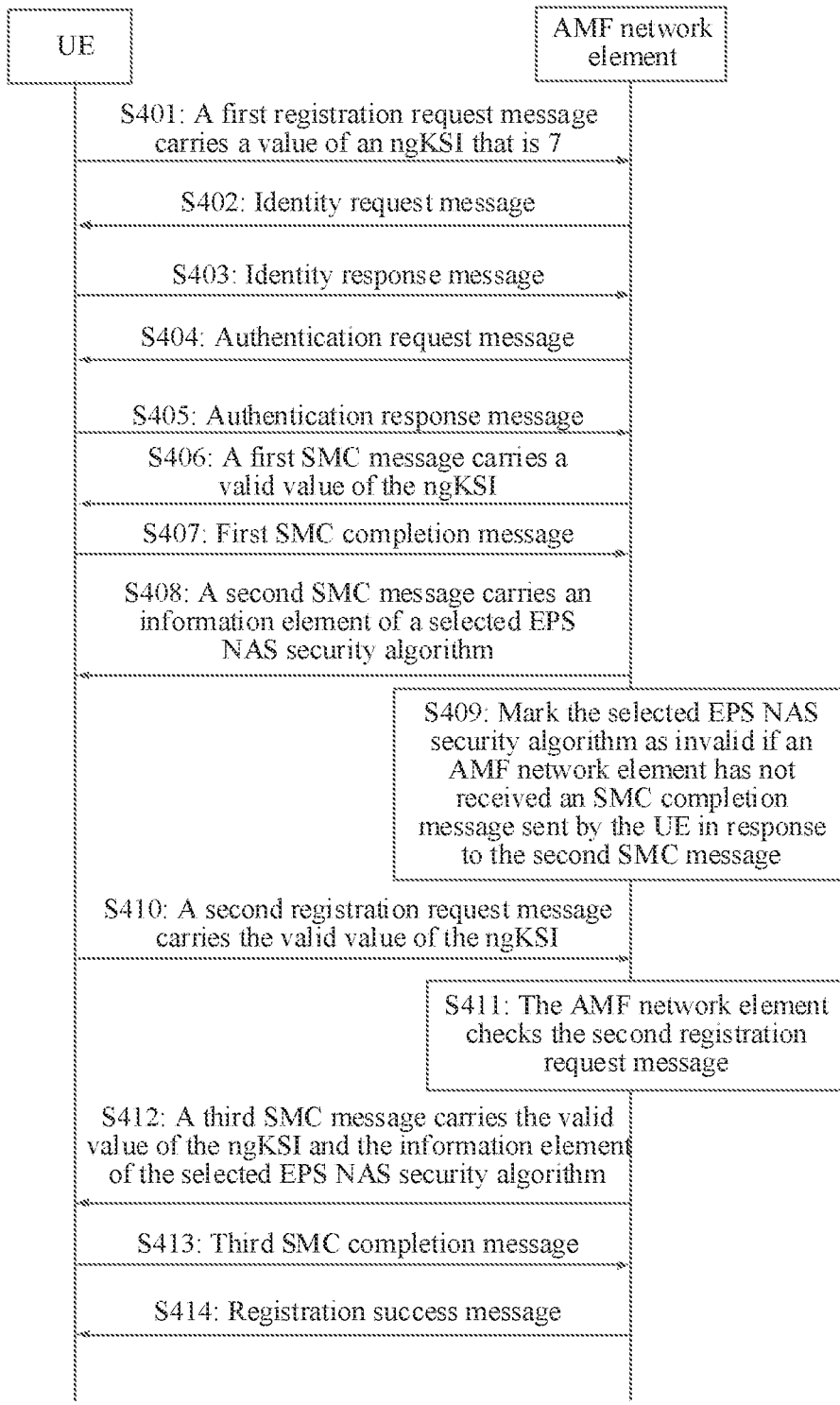
FIG. 4 is a schematic flowchart of a method for configuring an EPS NAS security algorithm according to an embodiment of this application.

FIG. 4 is a schematic flowchart of a method for configuring an EPS NAS security algorithm according to an embodiment of this application. As shown in FIG. 4, the method includes at least S401 to S414. In this embodiment, the access and mobility management function entity is an AMF network element.

S401. UE sends a registration request message to an AMF network element, where a value of an ngKSI carried in the registration request message is 7. For ease of description, the registration request message may be referred to as a first registration request message.

In this case, no 5G NAS security context exists on a UE side. Therefore, a value of a key set identifier for next generation radio access network (key set identifier for next generation radio access network, ngKSI) carried in the first registration request information initiated by the UE to the AMF network element is 7, where 7 indicates that no 5G NAS security context exists on the UE side.

S402. The AMF network element sends an identity request (identity request) message to the UE.

S403. The UE sends an identity response (identity response) message to the AMF network element.

S404. The AMF network element sends an authentication request (authentication request) message to the UE.

Optionally, after receiving the authentication request (authentication request) message sent by the AMF network element, the UE may generate an inactive 5G NAS security context based on the authentication request (authentication request) message.

S405. The UE sends an authentication response (authentication response) message to the AMF network element.

S402 to S405 are a process of performing identity authentication and authentication between the UE and the AMF network element. After the UE succeeds in the identity authentication and authentication of the AMF network element, the AMF network element performs the following registration process with the UE.

S406. The AMF network element sends an SMC message to the UE, where the SMC message carries a valid value of the ngKSI. The SMC message may be referred to as a first SMC message.

After the UE succeeds in the identity authentication and authentication of the AMF network element, the AMF network element sends the first SMC message to the UE, where the first SMC message carries a valid value of the ngKSI, and is used to activate a 5G NAS security context in the UE. In this case, a current security context (current security context) corresponding to the valid value of the ngKSI carried in the first SMC message exists in the UE. The valid value of the ngKSI may be any integer value from 0 to 6, and each integer value corresponds to a set of 5G NAS security contexts.

S407. The UE sends an SMC completion message to the AMF network element. The SMC completion message may be referred to as a first SMC completion message.

After successfully receiving the first SMC message sent by the AMF network element, and successfully activating the 5G NAS security context based on the valid value of the ngKSI carried in the first SMC message, the UE sends the first SMC completion message to the AMF network element.

It indicates that the 5G NAS security context corresponding to the valid value of the ngKSI has been configured for the UE.

S408. The AMF network element sends an SMC message to the UE, where the SMC message carries an information element of the selected EPS NAS security algorithm. The SMC message is referred to as a second SMC message.

After receiving the first SMC completion message sent by the UE, the AMF network element sends a second SMC message to the UE, where the second SMC message carries the information element of the selected EPS NAS security algorithm, and is configured to configure the EPS NAS security algorithm corresponding to the information element of the selected EPS NAS security algorithm for the UE. The information element of the EPS NAS security algorithm may be any integer value from 0 to 7, and each integer value corresponds to one EPS NAS security algorithm.

It may be understood that the UE in this embodiment supports an S1 mode, and the AMF network element supports an N26 interface.

S409. If the AMF network element has not received an SMC completion message sent by the UE in response to the second SMC message, the AMF network element marks the selected EPS NAS security algorithm as invalid. The SMC completion message is referred to as a second SMC completion message.

After the AMF network element sends the second SMC message to the UE, the AMF network element has not received the second SMC completion message sent by the UE. It indicates that the UE fails to configure the selected EPS NAS security algorithm corresponding to the information element of the selected EPS NAS security algorithm that is carried by the AMF in the second SMC message.

In a possible implementation, due to a factor such as an abnormal network signal, the UE has not received the second SMC message that carries the information element of the selected EPS NAS security algorithm and that is sent by the AMF network element.

In another possible implementation, the UE receives the second SMC message that carries the information element of the selected EPS NAS security algorithm and that is sent by the AMF network element, but fails to successfully configure the corresponding selected EPS NAS security algorithm based on the information element of the selected EPS NAS security algorithm.

S401 to S409 may be referred to as a first registration process. The registration process described below may be referred to as a second registration process.

S410. UE sends a registration request message to an AMF network element, where the registration request information carries a valid value of an ngKSI. The registration request message may be referred to as a second registration request message.

After performing the first registration process, the UE has successfully activated the corresponding 5G NAS security context based on the valid value of the ngKSI carried by the AMF network element in the first SMC message. When the UE initiates the second registration request message to the AMF network element, a value of the ngKSI carried in the second registration request message is a valid value of the ngKSI corresponding to the 5G NAS security context in the UE. In other words, the valid value of the ngKSI carried in the second registration request message by the UE is the same as the valid value of the ngKSI carried in the first SMC message of the AMF network element in the first registration process.

S411. The AMF network element checks the second registration request message.

The check performed by the AMF network element on the second registration request message includes performing integrity check on the second registration request message and determining whether the AMF network element can successfully decrypt a NAS message container (NAS message container) in the second registration request message.

S412. The AMF network element sends an SMC message to the UE, where the SMC message carries a valid value of the ngKSI and an information element of the selected EPS NAS security algorithm. The SMC message may be referred to as a third SMC message.

Details are as follows. The AMF network element checks whether a valid EPS NAS security algorithm exists in a security context corresponding to the ngKSI of the terminal device, and if the valid EPS NAS security algorithm does not exist, provides the selected EPS NAS security algorithm through an SMC process.

In this embodiment, because in S409, the AMF network element marks the selected EPS NAS security algorithm corresponding to the ngKSI in the current security context as invalid, the AMF network element sends the third SMC message to the UE.

For example, the valid value of the ngKSI carried in the third SMC message is the same as the valid value of the ngKSI carried in the second registration request information of the UE and the valid value of the ngKSI carried in the first SMC message of the AMF network element in the first registration request process. An information element that is of the selected EPS NAS security algorithm and that is carried in the third SMC message is the same as an information element that is of the EPS NAS security algorithm and that is carried by the AMF network element in the second SMC message. The terminal device configures the selected EPS NAS security algorithm based on the information element that is of the selected EPS NAS security algorithm and that is carried in the third SMC message.

S413. The UE sends an SMC completion message to the AMF network element. The SMC completion message may be referred to as a third SMC completion message.

After successfully configuring the selected EPS NAS security algorithm corresponding to the information element that is of the selected EPS NAS security algorithm and that is carried in the third SMC message by the AMF network element, the UE sends the third SMC completion message to the AMF network element.

S414. The AMF network element sends a registration success message to the UE.

After the UE successfully registers based on the second registration request message, the AMF network element sends a registration success message to the UE.

In the technical solution provided in this application, when the UE initiates a registration request message to the AMF network element when no 5G NAS security context exists, and when the UE supports the S1 mode, and a network supports the N26 interface, the UE successfully receives only the first SMC message in a first registration process, and activates the 5G NAS security context. When the AMF network element has not received a second SMC completion message from the UE, the AMF network element marks that the selected EPS NAS security algorithm has not been successfully configured, and when the UE initiates the second registration request message, the AMF network element provides the selected EPS NAS security algorithm for the UE again based on the marked information indicating that the selected EPS NAS security algorithm has not been successfully configured, to ensure that the AMF network element can successfully configure the selected EPS NAS security algorithm for the UE.

Figure 5:
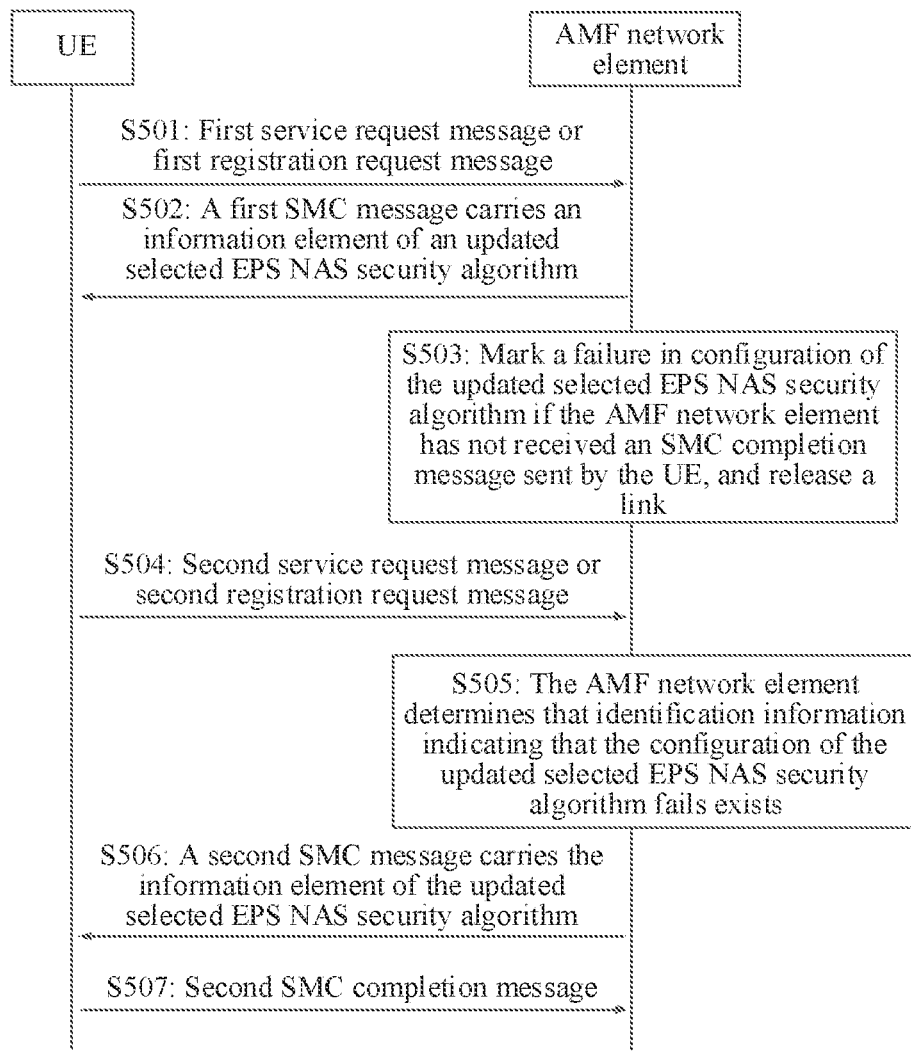
FIG. 5 is a schematic flowchart of a method for configuring an EPS NAS security algorithm according to another embodiment of this application.

FIG. 5 is a schematic flowchart of a method for configuring an EPS NAS security algorithm according to another embodiment of this application. As shown in FIG. 5, the method includes at least S501 to S507. In this embodiment, the access and mobility management function entity is an AMF network element.

S501. UE sends a service request message or a registration request message to an AMF network element. The service request message may be referred to as a first service request message, and the registration request message may be referred to as a first registration request message.

The UE sends an initial access process message such as the first service request message or the first registration request message to the AMF, to trigger link establishment and enter a connected state.

In this embodiment, the UE has a valid EPS NAS security algorithm.

S502. The AMF network element sends an SMC message to the UE, where the SMC message carries an information element of the updated selected EPS NAS security algorithm. The SMC message may be referred to as a first SMC message.

The AMF network element is to modify an existing EPS NAS security algorithm in the UE. Therefore, the first SMC message sent by the AMF network element to the UE carries the information element of the updated selected EPS NAS security algorithm to be configured for the UE.

S503. If the AMF network element has not received the SMC completion message sent by the UE, the AMF network element marks a failure in the configuration of the updated selected EPS NAS security algorithm, and releases a link. The SMC completion message may be referred to as a first SMC completion message.

If the AMF network element has not received the first SMC completion message, an initial access process such as the service request or the registration request is terminated. In this case, the AMF network element needs to mark marker information used to indicate that configuration of the updated selected EPS NAS security algorithm fails, and release a link resource.

S504. The UE sends a service request message or a registration request message to the AMF network element again. The service request message may be referred to as a second service request message, and the registration request message may be referred to as a second registration request message.

The UE sends an initial access process message such as the second service request message or the second registration request message to the AMF network element, triggers link establishment again, and then enters a connected state.

S505. The AMF network element determines that identification information indicating that configuration of the updated selected EPS NAS security algorithm fails exists.

After receiving an initial access process message such as the second service request message or the second registration request message sent by the UE, the AMF network element needs to determine whether the identification information used to indicate that the configuration of the updated selected EPS NAS security algorithm fails exists. If the identification information indicating that the configuration of the updated selected EPS NAS security algorithm fails exists in the AMF network element, the AMF network element needs to resend, to the UE, an SMC message that carries the information element of the updated selected EPS NAS security algorithm.

S506. The AMF network element sends an SMC message to the UE, where the SMC message carries an information element of the updated selected EPS NAS security algorithm. The SMC message may be referred to as a second SMC message.

The AMF network element sends a second SMC message to the UE, where the second SMC message carries an information element of the updated selected EPS NAS security algorithm that is to be configured for the UE.

Optionally, the information element that is of the updated selected EPS NAS security algorithm and that is carried in the second SMC message may be the same as the information element that is of the updated selected EPS NAS security algorithm and that is carried in the first SMC message, or may be different from the information element of the updated selected EPS NAS security algorithm that is carried in the first SMC message.

S507. The UE sends an SMC completion message to the AMF network element. The SMC completion message may be referred to as a second SMC completion message.

After successfully configuring the updated selected EPS NAS security algorithm corresponding to the information element that is of the updated selected EPS NAS security algorithm and that is carried by the AMF network element in the second SMC message, the UE sends the second SMC completion message to the AMF network element. In this case, the EPS NAS security algorithm in the UE is consistent with the updated selected EPS NAS security algorithm in the AMF network element.

In the technical solutions provided in this application, an EPS NAS security algorithm exists in the UE, and the AMF network element expects to change the EPS NAS security algorithm in the UE. When the UE is in a connected state, the AMF network element sends, to the UE, an SMC message that carries the information element of the updated selected EPS NAS security algorithm, but the AMF network element has not received a response to the SMC completion message sent by the UE, and the AMF network element marks the information indicating that the updated selected EPS NAS security algorithm has not been successfully modified. When the UE is in the connected state again, the AMF network element re-delivers the SMC message of the information element of the updated selected EPS NAS security algorithm to the UE based on the marked information indicating that the updated selected EPS NAS security algorithm has not been successfully modified. This ensures that the AMF network element can successfully configure the updated selected EPS NAS security algorithm for the UE, so that the EPS NAS security algorithm in the UE is consistent with that in the AMF network element.

Figure 6:
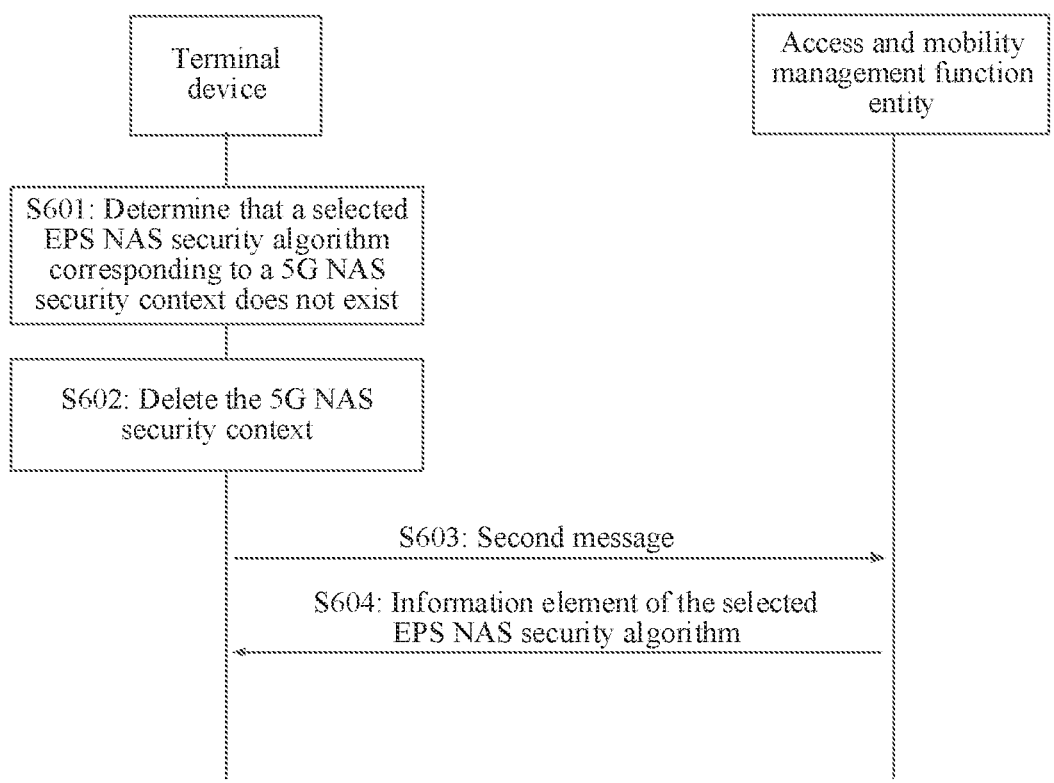
FIG. 6 is a schematic flowchart of another method for configuring an EPS NAS security algorithm according to an embodiment of this application.

FIG. 6 is a schematic flowchart of another method for configuring an EPS NAS security algorithm according to an embodiment of this application. As shown in FIG. 6, the method includes at least S601 to S604.

S601. A terminal device determines that a selected EPS NAS security algorithm corresponding to a 5G NAS security context does not exist.

In this embodiment, the 5G NAS security context already exists in the terminal device, but the selected EPS NAS security algorithm corresponding to the 5G NAS security context does not exist.

An implementation in which the terminal device activates the 5G NAS security context is that: After the terminal device sends a registration request message to an access and mobility management function entity, the access and mobility management function entity sends a third message to the terminal device, where the third message includes a 5G NAS security context: after receiving the third message and successfully activating the 5G NAS security context based on the third message, the terminal device sends a third completion message to the access and mobility management function entity, where the third completion message indicates that the terminal device has received the third message; and after receiving the third completion message from the terminal device, the access and mobility management function entity provides the selected EPS NAS security algorithm for the terminal device. An example of the third message is an SMC message, and an example of the third completion message is an SMC completion message.

In the implementation, an example in which the terminal device determines that the selected EPS NAS security algorithm corresponding to the 5G NAS security context does not exist includes the following: The terminal device determines that the information element of the selected EPS NAS security algorithm has not been received from the access and mobility management function entity. For example, if the terminal device has not received the information element of the selected EPS NAS security algorithm from the access and mobility management function entity within the preset time, it may be determined that the selected EPS NAS security algorithm corresponding to the 5G NAS security context does not exist.

In the possible implementation, the access and mobility management function entity supports an N26 interface, and the terminal device supports an S1 mode.

Another implementation in which the terminal device activates the 5G NAS security context is as follows: When the terminal device is connected to an LTE network, the terminal device requests registration from the AMF network element in the NR system and completes a registration process. The terminal device activates the 5G NAS security context in the registration process. After completing the registration process, the terminal device disconnects from the LTE network, and requests registration from the AMF network element in the NR system again.

In the implementation, an example in which the terminal device determines that the selected EPS NAS security algorithm corresponding to the 5G NAS security context does not exist includes the following: If no corresponding selected EPS NAS security algorithm exists in an ngKSI of the terminal device, it may be determined that the selected EPS NAS security algorithm corresponding to the 5G NAS security context does not exist.

In the possible implementation, the terminal device supports the S1 mode, and the terminal device may determine that the AMF network element supports the N26 interface.

S602. The terminal device deletes the 5G NAS security context.

If the terminal device determines that the selected EPS NAS security algorithm corresponding to the 5G NAS security context does not exist, the activated 5G NAS security context is deleted.

Optionally, if the terminal device determines that the selected EPS NAS security algorithm corresponding to the 5G NAS security context does not exist, the terminal device sets the ngKSI to an invalid value, that is, sets a value of the ngKSI to 7.

S603. The terminal device sends a second message to an access and mobility management function entity, where the second message is used to request the 5G NAS security context.

In an example, when the terminal device sends the second message to the access and mobility management function entity, a value of the ngKSI carried in the second message is 7, and 7 indicates that no 5G NAS security context exists in the terminal device.

Optionally, after the access and mobility management function entity receives, from the terminal device, the second message that carries a value of the ngKSI being 7, the access and mobility management function entity sends a fourth message to the terminal device, where the fourth message includes a valid value of the ngKSI. A valid value of the ngKSI may be any integer value from 0 to 6, and each integer value corresponds to a set of 5G NAS security contexts. An example of the fourth message is an SMC message.

If the terminal device successfully activates the 5G NAS security context based on the fourth message that is sent by the access and mobility management function entity and that carries the valid value of the ngKSI, the terminal device sends a fourth completion message to the access and mobility management function entity, where the fourth completion message indicates that the terminal device has received the valid value of the ngKSI sent by the access and mobility management function entity, and successfully activates, based on the valid value of the ngKSI, the 5G NAS security context corresponding to the valid value of the ngKSI. An example of the fourth completion message is an SMC completion message.

Optionally, a message that enables the access and mobility management function entity to be notified that a 5G NAS security context is provided to the terminal device may be referred to as a second message in this embodiment of this application.

For example, the second message may be a registration request message. The access and mobility management function entity may determine, based on a value of the ngKSI carried in the registration request message, whether a 5G NAS security context exists in the terminal device. If the value of the ngKSI carried in the registration request message is 7, it indicates that the 5G NAS security context does not exist in the terminal device, and the access and mobility management function entity needs to provide the 5G NAS security context for the terminal device.

S604. The terminal device receives an information element of the selected EPS NAS security algorithm from the access and mobility management function entity.

In an example, after reactivating the 5G NAS security context, the terminal device can receive a fifth message sent by the 5G NAS security context, where the fifth message includes an information element of the selected EPS NAS security algorithm determined by the 5G NAS security context. The information element of the selected EPS NAS security algorithm may be any integer value from 0 to 7, and each integer value corresponds to one selected EPS NAS security algorithm. An example of the fifth message is an SMC message.

In the technical solution provided in this application, when the 5G NAS security context already exists in the terminal device, it is first determined whether the corresponding selected EPS NAS security algorithm exists in the 5G NAS security context of the terminal device. If the terminal device determines that the corresponding selected EPS NAS security algorithm does not exist in the 5G NAS security context, the terminal device deletes the 5G NAS security context, and requests the 5G NAS security context from the access and mobility management function entity again. The access and mobility management function entity sends the 5G NAS security context and the information element of the corresponding selected EPS NAS security algorithm to the terminal device again, to ensure that the terminal device can successfully configure the EPS NAS security algorithm.

Figure 7:
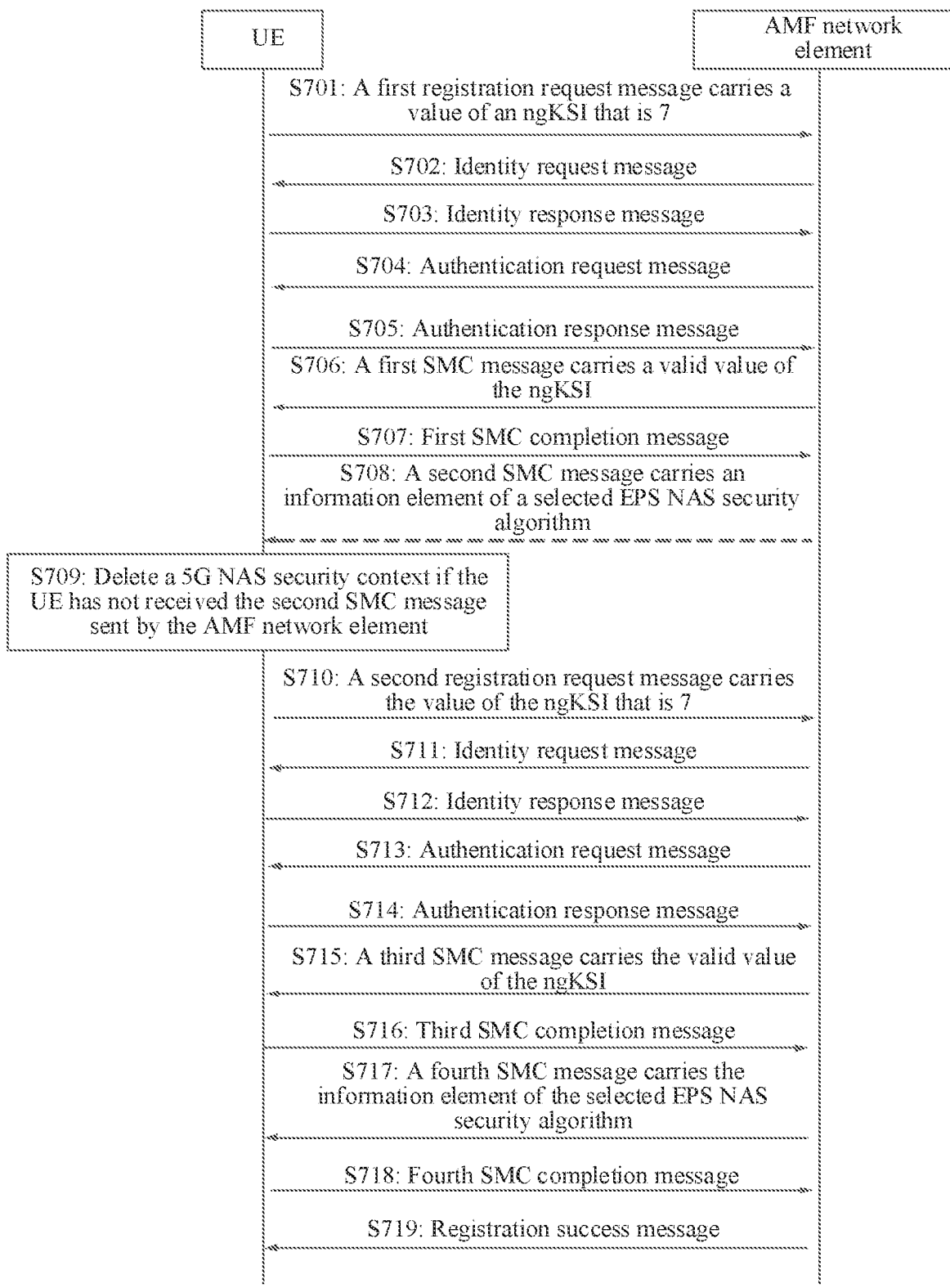
FIG. 7 is a schematic flowchart of a method for configuring an EPS NAS security algorithm according to still another embodiment of this application.

FIG. 7 is a schematic flowchart of a method for configuring an EPS NAS security algorithm according to still another embodiment of this application. As shown in FIG. 7, the method includes at least S701 to S719. In this embodiment, the access and mobility management function entity is an AMF network element.

S701. UE sends a registration request message to an AMF network element, where a value of an ngKSI carried in the registration request message is 7. For ease of description, the registration request message may be referred to as a first registration request message.

S702. The AMF network element sends an identity request (identity request) message to the UE.

S703. The UE sends an identity response (identity response) message to the AMF network element.

S704. The AMF network element sends an authentication request (authentication request) message to the UE.

S705. The UE sends an authentication response (authentication response) message to the AMF network element.

S706. The AMF network element sends an SMC message to the UE, where the SMC message carries a valid value of the ngKSI. The SMC message may be referred to as a first SMC message.

S707. The UE sends an SMC completion information to the AMF network element. The SMC completion message may be referred to as a first SMC completion message.

For S701 to S707 in this embodiment, reference may be made to S401 to S407. Details are not described herein again.

S708. The AMF network element sends an SMC message to the UE, where the SMC message carries an information element of the selected EPS NAS security algorithm. The SMC message is referred to as a second SMC message.

S709. If the UE has not received the second SMC message sent by the AMF network element, a 5G NAS security context is deleted.

In this embodiment, a possible reason why the UE has not received the second SMC message sent by the AMF network element is that the second SMC message fails to reach the UE due to interruption of a first registration process. Another possible reason is that the AMF network element does not perform S708, that is, the AMF network element does not send the information element of the selected EPS NAS security algorithm to the UE. It may be learned that S708 in this embodiment is optional, that is, not a mandatory step.

In S707, the UE sends the first SMC completion message to the AMF network element, which indicates that the UE has successfully activated the 5G NAS security context corresponding to the valid value of the ngKSI carried in the first SMC message. However, if the UE has not received the second SMC message sent by the AMF network element, it indicates that the selected EPS NAS security algorithm corresponding to the information element that is of the selected EPS NAS security algorithm and that is carried in the second SMC message does not exist in the UE. In this case, the UE needs to delete the activated 5G NAS security context and initiates a registration request to the AMF again to request the 5G NAS security context.

S701 to S709 may be referred to as a first registration process. The registration process described below may be referred to as a second registration process.

S710. UE sends a registration request message to an AMF network element, where a value of an ngKSI carried in the registration request message is 7. The registration request message may be referred to as a second registration request message.

Because the UE deletes the 5G NAS security context in S709, a value of the ngKSI carried in the second registration request message sent by the UE to the AMF network element is 7, where 7 indicates that the 5G NAS security context does not exist in the UE.

S711. The AMF network element sends an identity request (identity request) message to the UE.

S712. The UE sends an identity response (identity response) message to the AMF network element.

S713. The AMF network element sends an authentication request (authentication request) message to the UE.

S714. The UE sends an authentication response (authentication response) message to the AMF network element.

It should be noted that, for S711 to S714, reference may be made to S402 to S405, and details are not described herein again.

S715. The AMF network element sends an SMC message to the UE, where the SMC message carries a valid value of the ngKSI. The SMC message may be referred to as a third SMC message.

After the UE succeeds in identity authentication and authentication of the AMF network element, the AMF network element sends a third SMC message to the UE, where the third SMC message carries a valid value of the ngKSI, and is used to activate the 5G NAS security context in the UE.

Optionally, the valid value of the ngKSI carried in the third SMC message is the same as a valid value of the ngKSI carried in the first SMC information.

S716. The UE sends an SMC completion message to the AMF network element. The SMC completion message may be referred to as a third SMC message.

After the UE successfully receives the third SMC message sent by the AMF, and successfully activates the 5G NAS security context based on the valid value of the ngKSI carried in the third SMC message, the UE sends the third SMC completion message to the AMF network element. It indicates that the 5G NAS security context corresponding to the valid value of the ngKSI has been successfully configured for the UE. The valid value of the ngKSI may be any integer value from 0 to 6, and each integer value corresponds to one 5G NAS security context.

S717. The AMF network element sends an SMC message to the UE, where the SMC message carries an information element of the selected EPS NAS security algorithm. The SMC message may be referred to as a fourth SMC message.

After receiving the third SMC completion message sent by the UE, the AMF network element sends a fourth SMC message to the UE, where the fourth SMC message carries an information element of the selected EPS NAS security algorithm, which is used to configure, for the UE, the selected EPS NAS security algorithm corresponding to the information element of the selected EPS NAS security algorithm.

Optionally, the information element of the selected EPS NAS security algorithm carried in the fourth SMC message is the same as the information element of the selected EPS NAS security algorithm carried in the second SMC message.

S718. The UE sends an SMC completion message to the AMF network element. The SMC completion message may be referred to as a fourth SMC message.

After successfully configuring the selected EPS NAS security algorithm corresponding to the information element that is of the selected EPS NAS security algorithm and that is carried in the fourth SMC message by the AMF network element, the UE sends the fourth SMC completion message to the AMF network element.

S719. The AMF network element sends a registration success message to the UE.

After the UE successfully registers based on the second registration request message, the AMF network element sends a registration success message to the UE. In this case, the UE successfully activates the 5G NAS security context through the second registration request message, and successfully configures the selected EPS NAS security algorithm.

In the technical solution provided in this application, when the 5G NAS security context does not exist, the UE initiates a registration request message to the AMF. When the UE receives only the first SMC message, but has not received the second SMC message for which the EPS NAS security algorithm is configured, the UE proactively deletes the activated 5G NAS security context, and requests the 5G NAS security context from the AMF network element in a registration request message initiated to the AMF network element again. The AMF network element sends the 5G NAS security context and the information element of the selected EPS NAS security algorithm to the terminal device again, to ensure that the terminal device can successfully configure the EPS NAS security algorithm.

Figure 8:
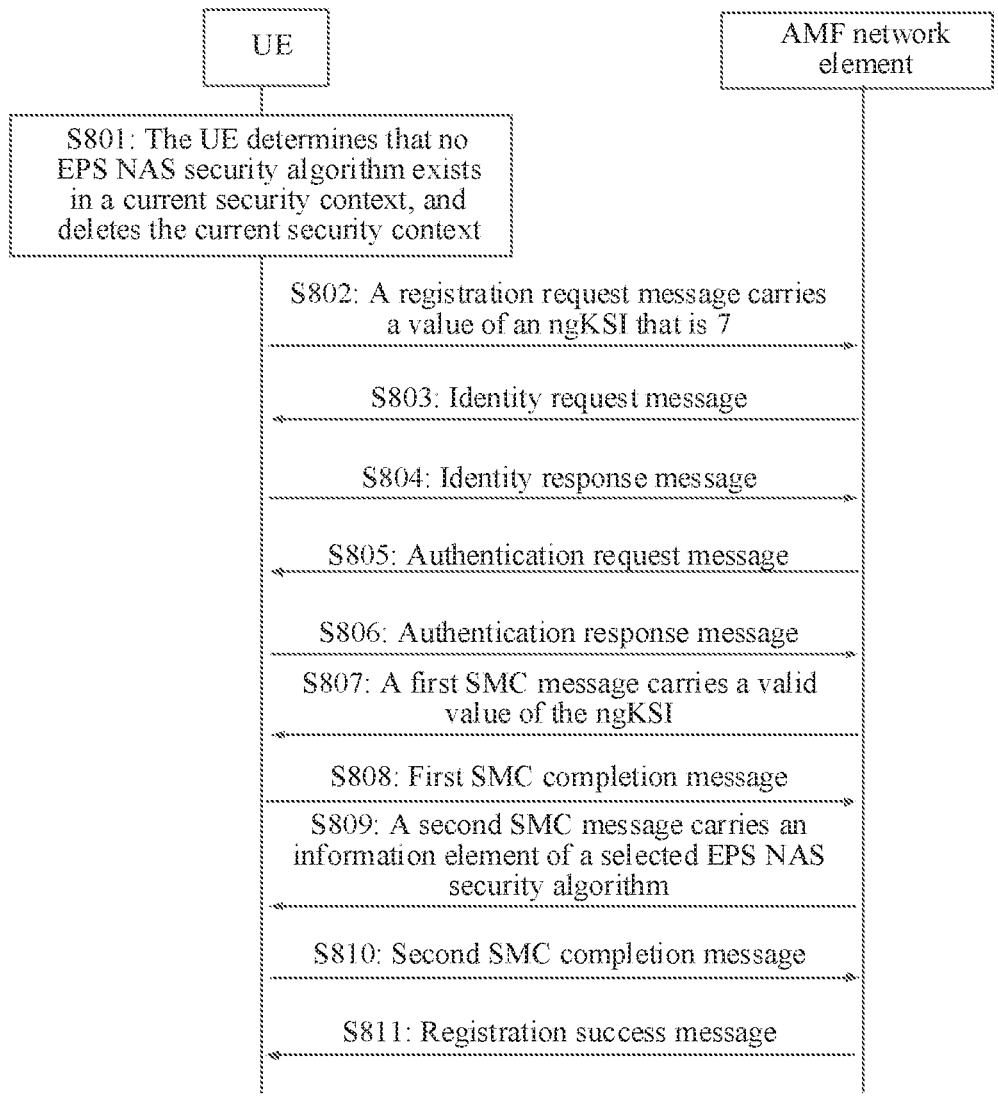
FIG. 8 is a schematic flowchart of a method for configuring an EPS NAS security algorithm according to still another embodiment of this application.

FIG. 8 is a schematic flowchart of a method for configuring an EPS NAS security algorithm according to still another embodiment of this application. This embodiment is applicable to a scenario in which a terminal device is disconnected from an LTE system and requests to register with an NR system again when the terminal device has completed a registration process with the NR system in the LTE system and successfully activated a 5G NAS security context. As shown in FIG. 8, the method includes at least S801 to S811. In this embodiment, the access and mobility management function entity is an AMF network element.

S801. UE determines that no EPS NAS security algorithm exists in a current security context, and deletes the current security context.

Before initiating a registration request to the NR system, the UE needs to determine whether a valid EPS NAS security algorithm corresponding to an ngKSI exists in a current security context of the UE. If the valid EPS NAS security algorithm corresponding to the ngKSI does not exist in the current security context of the UE, the current security context of the UE is deleted, that is, a value of a NAS key set identifier in the ngKSI is changed to 7, where 7 indicates that no 5G NAS security context exists in the UE.

S802. The UE sends a registration request message to an AMF network element, where a value of the ngKSI carried in the registration request message is 7.

S803. The AMF network element sends an identity request (identity request) message to the UE.

S804. The UE sends an identity response (identity response) message to the AMF network element.

S805. The AMF network element sends an authentication request (authentication request) message to the UE.

S806. The UE sends an authentication response (authentication response) message to the AMF network element.

S807. The AMF network element sends an SMC message to the UE, where the SMC message carries a valid value of the ngKSI. The SMC message may be referred to as a first SMC message.

S808. The UE sends an SMC completion message to the AMF network element. The SMC completion message may be referred to as a first SMC completion message.

S809. The AMF network element sends an SMC message to the UE, where the SMC message carries an information element of the selected EPS NAS security algorithm. The SMC message is referred to as a second SMC message.

S810. The UE sends an SMC completion message to the AMF network element.

S811. The AMF network element sends registration completion information to the UE. The SMC completion message is referred to as a second SMC completion message.

For S802 to S811 in this embodiment, reference may be made to S710 to S719. Details are not described herein again.

In the technical solution provided in this application, when the UE is connected to the LTE system, a registration process with the NR system is completed, and the 5G NAS security context has been successfully activated. After being disconnected from the LTE network, when the UE initiates a registration request to the NR system again, first it is determined whether an EPS NAS security algorithm exists in the 5G NAS security context of the UE. If the EPS NAS security algorithm does not exist in the 5G NAS security context of the UE, the 5G NAS security context of the UE is deleted. In addition, the 5G NAS security context is requested again from the AMF network element in the registration request, and the AMF network element sends the 5G NAS security context and the information element of the selected EPS NAS security algorithm to the UE. This ensures that the UE can successfully configure the EPS NAS security algorithm.

Figure 9:
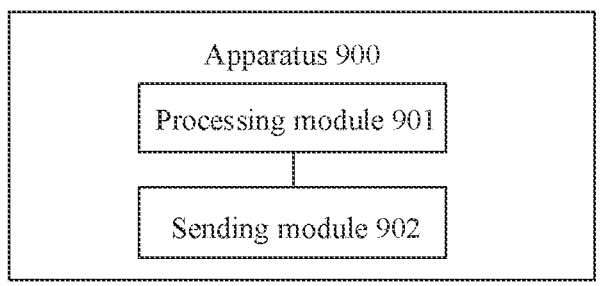
FIG. 9 is a schematic structural diagram of an apparatus for configuring an EPS NAS security algorithm according to an embodiment of this application.

FIG. 9 is a schematic structural diagram of an apparatus for configuring an EPS NAS security algorithm according to an embodiment of this application. As shown in FIG. 9, the apparatus 900 may include a processing module 901 and a sending module 902. The apparatus 900 may be configured to implement operations implemented by an access and mobility management function entity or an AMF network element in the embodiments shown in any one of FIG. 3 to FIG. 5.

In a possible implementation, the apparatus 900 may be configured to implement the method shown in FIG. 3. For example, the processing module 901 is configured to implement S301, and the sending module 902 is configured to implement S302.

In another possible implementation, the apparatus 900 may further include a receiving module. The apparatus 900 in the implementation may be configured to implement the method shown in FIG. 4. For example, the processing module 901 is configured to implement S409 and S411, the sending module 902 is configured to implement S402, S404, S406, S408, S412, and S414, and the receiving module is configured to implement S401, S403. S405, S407, S410, and S413.

In still another possible implementation, the apparatus 900 may further include a receiving module. The apparatus 900 in the implementation may be configured to implement the method shown in FIG. 5. For example, the processing module 901 is configured to implement S503 and S505, the sending module 902 is configured to implement S502 and S506, and the receiving module is configured to implement S501, S504, and S507.

Figure 10:
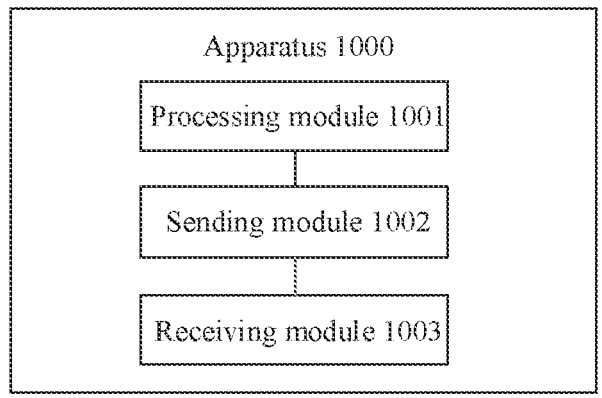
FIG. 10 is a schematic structural diagram of an apparatus for configuring an EPS NAS security algorithm according to another embodiment of this application.

FIG. 10 is a schematic structural diagram of an apparatus for configuring an EPS NAS security algorithm according to another embodiment of this application. As shown in FIG.

10, an apparatus 1000 may include a processing module 1001, a sending module 1002, and a receiving module 1003. The apparatus 1000 may be configured to implement operations implemented by the terminal device in the embodiment shown in any one of FIG. 6 to FIG. 8.

In a possible implementation, the apparatus 1000 may be configured to implement the method shown in FIG. 6. For example, the processing module 1001 is configured to implement S601 and S602, the sending module 1002 is configured to implement S603, and the receiving module 1003 is configured to implement S604.

In another possible implementation, the apparatus 1000 may be configured to implement the method shown in FIG. 7. For example, the processing module 1001 is configured to implement S709, the sending module 1002 is configured to implement S701, S703, S705, S707, S710, S712, S714, S716, and S718, and the receiving module 1003 is configured to implement S702, S704, S706, S708, S711, S713, S715, S717, and S719.

In still another possible implementation, the apparatus 1000 may be configured to implement the method shown in FIG. 8. For example, the processing module 1001 is configured to implement S801, the sending module 1002 is configured to implement S802, S804, S806, S808, and S810, and the receiving module 1003 is configured to implement S803, S805, S807, S809, and S811.

Figure 11:
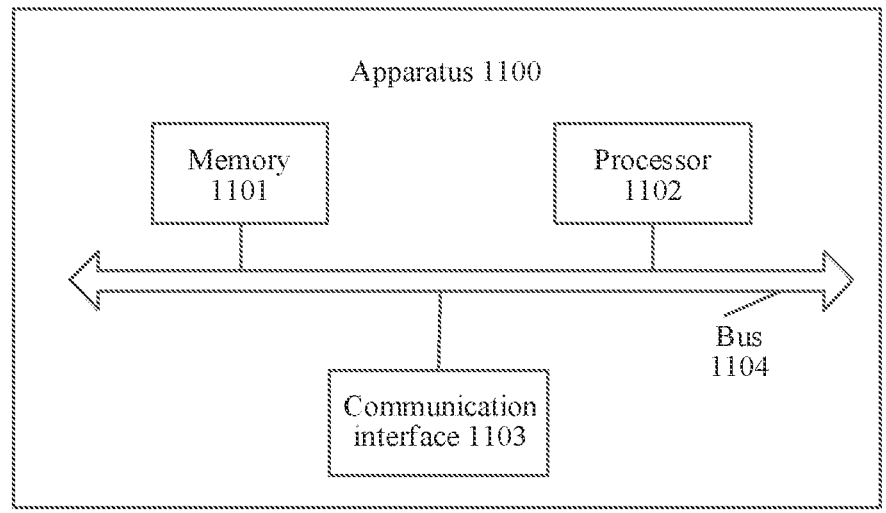
FIG. 11 is a schematic structural diagram of an apparatus for configuring an EPS NAS security algorithm according to still another embodiment of this application.

FIG. 11 is a schematic structural diagram of an apparatus for configuring an EPS NAS security algorithm according to still another embodiment of this application. The apparatus 1100 shown in FIG. 11 may be configured to perform the method implemented by an access and mobility management function entity or an AMF network element in any one of the embodiments shown in FIG. 3 to FIG. 5, or may be configured to perform the method implemented by a terminal device in any one of the embodiments shown in FIG. 6 to FIG. 8.

As shown in FIG. 11, the apparatus 1100 in this embodiment includes: a memory 1101, a processor 1102, a communication interface 1103, and a bus 1104. The memory 1101, the processor 1102, and the communication interface 1103 communicate with each other through the bus 1104.

The memory 1101 may be a read only memory (read only memory, ROM), a static storage device, a dynamic storage device, or a random access memory (random access memory, RAM). The memory 1101 may store a program. When the program stored in the memory 1101 is executed by the processor 1102, the processor 1102 may be configured to perform steps of the methods shown in FIG. 3 to FIG. 8.

The processor 1102 may be a general-purpose central processing unit (central processing unit, CPU), a microprocessor, an application specific integrated circuit (application specific integrated circuit. ASIC), or one or more integrated circuits, and is configured to execute a related program, to implement the method for configuring an EPS NAS security algorithm in the method embodiments of this application.

The processor 1102 may further be an integrated circuit chip, and has a signal processing capability. In an implementation process, the steps of the method in embodiments of this application may be completed through an integrated logic circuit of hardware in the processor 1102 or instructions in a form of software.

The processor 1102 may further be a general-purpose processor, a digital signal processor (digital signal processor, DSP), an application-specific integrated circuit (ASIC), a field programmable gate array (field programmable gate array, FPGA) or another programmable logical device, a discrete gate or a transistor logic device, or a discrete hardware component. The methods, the steps, and logical block diagrams that are disclosed in embodiments of this application may be implemented or performed. The general purpose processor may be a microprocessor, or the processor may be any conventional processor or the like.

Steps of the methods disclosed with reference to embodiments of this application may be directly performed and completed through a hardware decoding processor, or may be performed and completed through a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1101, and the processor 1102 reads information in the memory 1101, and completes, with reference to hardware of the processor, functions that need to be performed in the methods in embodiments of this application. For example, the processor may perform steps/functions in the embodiments shown in FIG. 3 to FIG. 8.

The communication interface 1103 may use, but not limited to, a transceiver apparatus of a transceiver type, to implement communication between the apparatus 1100 and another device or a communication network.

The bus 1104 may be included in a channel on which information is transmitted among the components (for example, the memory 1101, the processor 1102, and the communication interface 1103) of the apparatus 1100.

It should be understood that the apparatus 1100 shown in this embodiment of this application may be an electronic device, or may be a chip configured in an electronic device.

It should be understood that, the processor in this embodiment of this application may be a central processing unit (central processing unit. CPU), and may further be another general-purpose processor, a digital signal processor (digital signal processor, DSP), an application specific integrated circuit (application specific integrated circuit, ASIC), a field programmable gate array (field programmable gate array, FPGA), or another programmable logic device, a discrete gate or a transistor logic device, a discrete hardware component, or the like. The general purpose processor may be a microprocessor, or the processor may be any conventional processor or the like.

It should be further understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

All or a part of the foregoing embodiments may be implemented using software, hardware, firmware, or any combination thereof. When software is used to implement the foregoing embodiments, all or a part of the foregoing embodiments may be implemented in a form of a computer program product. The computer program product includes one or more computer instructions or computer programs. When the computer instructions or the computer programs are loaded and executed on a computer, the process or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium, or the like. The semiconductor medium may be a solid-state drive.

It should be understood that the term "and/or" in this specification describes only an association relationship for describing associated objects and represents that three relationships may exist. For example. A and/or B may represent the following three cases: Only A exists, both A and B exist, and only B exists, where A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. "At least one of the following items (pieces)" or a similar expression thereof refers to any combination of these items, including any combination of singular items (pieces) or plural items (pieces). For example, at least one of a, b, or c may represent: a, b, c, a-b, a-c, b-c, or a-b-c, where a, b, and c may be one or more.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be another division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technologies, or a part of the technical solutions may be implemented in a form of a software product. The computer software product is stored in a storage medium, and includes several instructions for enabling a computer device (which may be a personal computer, a server, a network device, or the like) to perform all or a part of the steps of the methods described in embodiments of this application. The foregoing storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for configuring an evolved packet system (EPS) non-access stratum (NAS) security algorithm, wherein the method comprises:
receiving, by an access and mobility management function entity, a first registration request message from a terminal device;

determining, in response to the first registration request message by the access and mobility management function entity, whether a selected EPS NAS security algorithm has been successfully provided to the terminal device when a valid 5th generation mobile communication (5G) NAS security context indicated by the terminal device exists on the access and mobility management function entity; and providing, by the access and mobility management function entity, the selected EPS NAS security algorithm to the terminal device when the access and mobility management function entity determines that the selected EPS NAS security algorithm has not been successfully provided to the terminal device.

2. The method according to claim 1, wherein before the determining, by the access and mobility management function entity, whether a selected EPS NAS security algorithm has been successfully provided to the terminal device, the method further comprises:

sending, by the access and mobility management function entity, a first message to the terminal device, wherein the first message comprises an information element of the selected EPS NAS security algorithm; and the determining, by an access and mobility management function entity, that a selected EPS NAS security algorithm has not been successfully provided to a terminal device comprises: determining, by the access and mobility management function entity, that a first completion message has not been received, wherein the first completion message indicates that the terminal device has received the first message.

3. The method according to claim 2, wherein the determining, by the access and mobility management function entity, that a first completion message has not been received comprises:

determining, by the access and mobility management function entity, that the first completion message has not been received within a preset time.

4. The method according to claim 2, wherein the first message is a security mode command (SMC) message, and the first completion message is an SMC completion message.

5. The method according to claim 2, wherein before the sending, by the access and mobility management function entity, a first message to the terminal device, the method further comprises:

receiving, by the access and mobility management function entity, a second registration request message from the terminal device, wherein the second registration request message comprises a first key set identifier for next generation radio access network (ngKSI), and the first ngKSI indicates that no 5G NAS security context exists on the terminal device.

6. The method according to claim 1, wherein the providing, by the access and mobility management function entity, the selected EPS NAS security algorithm for the terminal device comprises:

sending, by the access and mobility management function entity, a first message to the terminal device, wherein the first message comprises an information element of the selected EPS NAS security algorithm, and the first message is an SMC message.

7. The method according to claim 1, wherein the method further comprises:

marking, by the access and mobility management function entity, the selected EPS NAS security algorithm as invalid in response to determining that the selected EPS NAS security algorithm has not been successfully provided to the terminal device.

8. The method according to claim 1, wherein the method further comprises:

determining, by the access and mobility management function entity, to update the selected EPS NAS security algorithm; and providing, by the access and mobility management function entity, an updated selected EPS NAS security algorithm for the terminal device.

9. The method according to claim 8, wherein the method further comprises:

determining, by the access and mobility management function entity, that the updated selected EPS NAS security algorithm has not been successfully provided to the terminal device; and providing, by the access and mobility management function entity, the updated selected EPS NAS security algorithm for the terminal device.

10. The method according to claim 1, wherein the access and mobility management function entity supports an N26 interface, and the terminal device supports an S1 mode.

11. A method for configuring an evolved packet system (EPS) non-access stratum (NAS) security algorithm, wherein the method comprises:

determining, by a terminal device, that a selected EPS NAS security algorithm corresponding to a 5th generation mobile communication (5G) NAS security context does not exist;

deleting, by the terminal device, the 5G NAS security context;

sending, by the terminal device, a second message to an access and mobility management function entity, wherein the second message is used to request the 5G NAS security context; and receiving, by the terminal device, an information element of the selected EPS NAS security algorithm from the access and mobility management function entity.

12. The method according to claim 11, wherein before the determining, by a terminal device, that a selected EPS NAS security algorithm corresponding to a 5G NAS security context does not exist, the method further comprises:

receiving, by the terminal device, a third message sent by the access and mobility management function entity, wherein the third message comprises the 5G NAS security context; and sending, by the terminal device, a third completion message to the access and mobility management function entity, wherein the third completion message indicates that the terminal device has received the third message.

13. The method according to claim 11, wherein the determining, by a terminal device, that a selected EPS NAS security algorithm corresponding to a 5G NAS security context does not exist comprises:

determining that a next generation radio access network key set identifier (ngKSI) does not correspond to the selected EPS NAS security algorithm.

14. The method according to claim 11, wherein the access and mobility management function entity supports an N26 interface, and the terminal device supports an S1 mode.

15. An apparatus comprising:
at least one processor, and
at least one memory storing instructions, when executed by the at least one processor, to cause the apparatus to:
receive a first registration request message from a terminal device;

determine, in response to the first registration request message, whether a selected evolved packet system (EPS) non- access stratum (NAS) security algorithm has been successfully provided to the terminal device when a valid 5th generation mobile communication (5G) NAS security context indicated by the terminal device exists on the apparatus; and provide the selected EPS NAS security algorithm to the terminal device when the apparatus determines that the selected EPS NAS security algorithm has not been successfully provided to the terminal device.

16. The apparatus according to claim 15, wherein the determining that the selected EPS NAS security algorithm has not been successfully provided to a terminal device comprises:

sending a first message to the terminal device, wherein the first message comprises an information element of the selected EPS NAS security algorithm; and determining that a first completion message has not been received, wherein the first completion message indicates that the terminal device has received the first message.

17. The apparatus according to claim 16, wherein the determining that the first completion message has not been received comprises determining that the first completion message has not been received within a preset time.

18. The apparatus according to claim 16, wherein the first message is a security mode command (SMC) message, and the first completion message is an SMC completion message.

19. The apparatus according to claim 15, wherein the instructions further cause the apparatus to:

mark the selected EPS NAS security algorithm as invalid in response to determining that the selected EPS NAS security algorithm has not been successfully provided to the terminal device.

20. The apparatus according to claim 15, wherein the providing the selected EPS NAS security algorithm for the terminal device comprises sending a first message to the terminal device, wherein the first message comprises an information element of the selected EPS NAS security algorithm, and the first message is an SMC message.

21. The apparatus according to claim 15, wherein the apparatus supports an N26 interface, and the terminal device supports an S1 mode.

22. An apparatus comprising:

at least one processor and at least one memory storing instructions, when executed by the at least one processor, to cause the apparatus to:

determine that a selected evolved packet system (EPS) non-access stratum (NAS) security algorithm corresponding to a 5th generation mobile communication (5G) NAS security context does not exist;

delete the 5G NAS security context;

send a second message to an access and mobility management function entity, wherein the second message is used to request the 5G NAS security context; and receive an information element of the selected EPS NAS security algorithm from the access and mobility management function entity.

* * * * *